United States Patent
Huang et al.

(10) Patent No.: US 8,209,555 B2
(45) Date of Patent: Jun. 26, 2012

(54) COMPUTER SYSTEM

(75) Inventors: Li-Hong Huang, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 629 days.

(21) Appl. No.: 12/401,122

(22) Filed: Mar. 10, 2009

(65) Prior Publication Data
US 2010/0131779 A1 May 27, 2010

(30) Foreign Application Priority Data

Nov. 27, 2008 (TW) ................................ 97146006 A

(51) Int. Cl.
*G06F 1/00* (2006.01)
(52) U.S. Cl. ........................................ 713/300; 713/320
(58) Field of Classification Search ........... 713/300–344
See application file for complete search history.

(56) References Cited

U.S. PATENT DOCUMENTS 6,862,200 B2 * 3/2005 Sullivan et al. ................. 363/65
2008/0046769 A1 * 2/2008 Osano et al. .................. 713/324

* cited by examiner

*Primary Examiner* — Brian Misiura
*Assistant Examiner* — Kim Huynh
(74) *Attorney, Agent, or Firm* — J.C. Patents

(57) ABSTRACT

A computer system including a first and second main boards, a judgment unit, a power supply, a first switch and second switch is provided. The judgment unit receives a first and second power start signals from the first and second main boards, and outputs a total power start signal. The power supply outputs a power reply signal according to the total power start signal. The first and second switches determine whether to output a power good signal individually according to the first and second power start signals. When one of the first and second power start signals is available, the total power start signal and the power reply signal are available, and the power supply outputs an operating voltage. When the first and second power start signals are unavailable, the total power start signal and the power reply signal are unavailable, and the power supply stops outputting the operating voltage.

16 Claims, 4 Drawing Sheets

COMPUTER SYSTEM

CROSS-REFERENCE TO RELATED APPLICATION

This application claims the priority benefit of Taiwan application serial no. 97146006, filed Nov. 27, 2008. The entirety of the above-mentioned patent application is hereby incorporated by reference herein and made a part of specification.

BACKGROUND OF THE INVENTION

1. Field of the Invention

The present invention is related to a computer system and particularly to a computer system having main boards which can be controlled independently.

2. Description of Related Art

FIG. 1 is a circuit block diagram of a conventional computer system. Referring to FIG. 1, a conventional computer system 100 includes a plurality of main boards 110-130 and a power supply 140. In overall operation, the main boards 110-130 determine whether to output power start signals PSON_11, PSON_12 and PSON_13 according to received identification codes.

On the other hand, for the power supply 140, when the power start signals PSON_11, PSON_12 or PSON_13 is received, the power supply 140 outputs an operating voltage PW1 and a power reply signal PSOK1. Thus, when the main boards 110-130 receive the power reply signal PSOK1, the main boards 110-130 detect that the power supply 140 has started providing power. At this moment, the main boards 110-130 use the operating voltage PW1 to drive inner circuits thereof and start acting.

It should be noted that the power start signals PSON_11, PSON_12 and PSON_13 are transmitted to the power supply 140 through the same line, and the power supply 140 transmits simultaneously the operating voltage PW1 and the power reply signal PSOK1 to each of the main boards 110-130. Therefore, when only the main board 110 outputs the power start signal PSON_11 and the remaining main boards 120-130 do not output the power start signals PSON_12 and PSON_13, the main boards 110-130 are all driven by the power supply 140 to operate at the operating voltage PW1.

In other words, for the conventional computer system 100, the main boards 110-130 cannot act independently. Such circumstances not only cause inconvenience to users during operation, but also cause the conventional computer system 100 to consume more power.

SUMMARY OF THE INVENTION

The present invention provides a computer system having a plurality of main boards therein which can be controlled independently.

The present invention provides a computer system capable of reducing power consumption through independent control of a plurality of main boards therein.

The present invention provides a computer system including a first and a second main boards, a judgment unit, a power supply and a first and a second switches. The first and the second main boards generate a first and a second power start signals respectively. The judgment unit receives the first and the second power start signals and outputs a total power start signal. The power supply outputs a power reply signal according to the total power start signal. On the other hand, the first and the second switches determine whether to output a power good signal according to the first and the second power start signals respectively. When one of the first and the second power start signals is available, the total power start signal and the power reply signal are both available, and the power supply outputs an operating voltage. On the contrary, when the first and the second power start signals are both unavailable, the total power start signal and the power reply signal are both unavailable, and the power supply stops outputting the operating voltage.

According to an embodiment of the present invention, the judgment unit includes a first resistor, a second resistor, a third resistor, a first diode and a second diode. A first end of the first resistor receives a first voltage, and a second end of the first resistor receives the first power start signal. A first end of the second resistor receives the first voltage, and a second end of the second resistor receives the second power start signal. A first end of the third resistor receives the first voltage, and a second end of the third resistor outputs the total power start signal. Moreover, the first diode is electrically connected between the second ends of the first resistor and the third resistor. The second diode is electrically connected between the second ends of the second resistor and the third resistor.

From another aspect, the present invention further provides a computer system including N main boards, a judgment unit, a power supply and N switches, N being a positive integer. The N main boards generate N power start signals. The judgment unit receives the N power start signals and outputs a total power start signal. The power supply outputs a power reply signal according to the total power start signal. On the other hand, for the N switches, a first end of an $i^{th}$ switch of the N switches receives the power reply signal and determines whether to output an $i^{th}$ power good signal through a second end of the $i^{th}$ switch according to an $i^{th}$ power start signal of the N power start signals, i being an integer and $1 \leq i \leq N$. When one of the N power start signals is available, the total power start signal and the power reply signal are both available, and the power supply outputs an operating voltage. On the contrary, when all the N power start signals are unavailable, the total power start signal and the power reply signal are both unavailable, and the power supply stops outputting the operating voltage.

According to an embodiment of the present invention, the judgment unit includes (N+1) resistors and N diodes. For the (N+1) resistors, a first end of an $i^{th}$ resistor receives a first voltage, and a second end of the $i^{th}$ resistor receives the $i^{th}$ power start signal. Furthermore, a first end of an $(N+1)^{th}$ resistor receives the first voltage, and a second end of the $(N+1)^{th}$ resistor outputs the total power start signal. On the other hand, for the N diodes, an $i^{th}$ diode is electrically connected between the second ends of the $i^{th}$ resistor and the $(N+1)^{th}$ resistor.

In view of the foregoing, in the present invention, the judgment unit prevents the power start signals generated by each of the main boards from affecting one another. In addition, under the control of the switches, the power reply signals generated by the power supply are not submitted to each of the main boards simultaneously such that accidental contact of the main boards is avoided. Further, only those main boards which generate available power start signals can turn on the switches and use the operating voltage to drive inner circuits of the main boards and start acting. In other words, compared with the prior art, the main boards in the computer system of the present invention can be controlled independently from one another so as to reduce the power consumption of the computer system effectively. Additionally, with the independent control among the main boards, consequently, users enjoy more convenience during operation.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
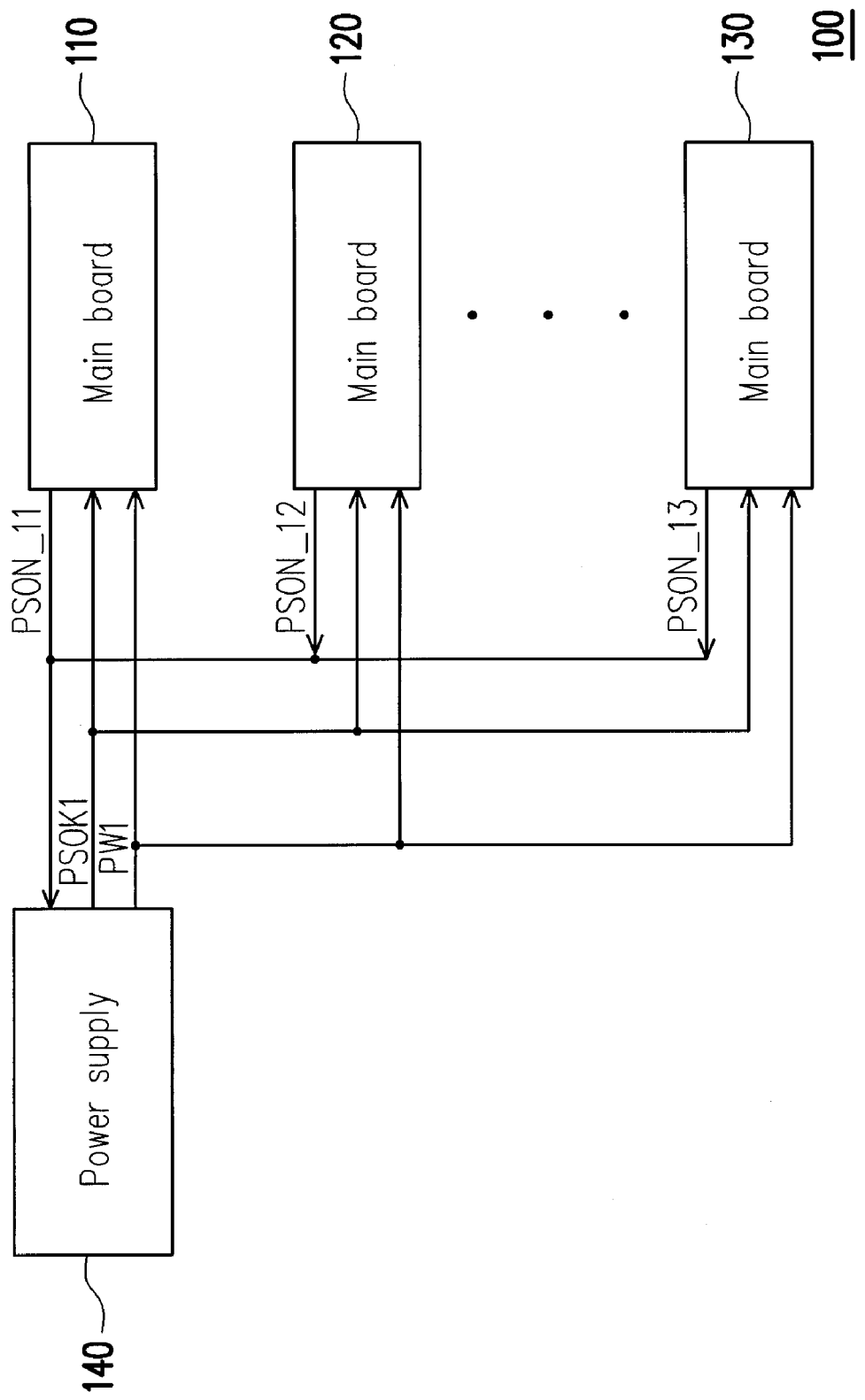
FIG. 1 is a schematic circuit block diagram of a conventional computer system.
Figure 2:
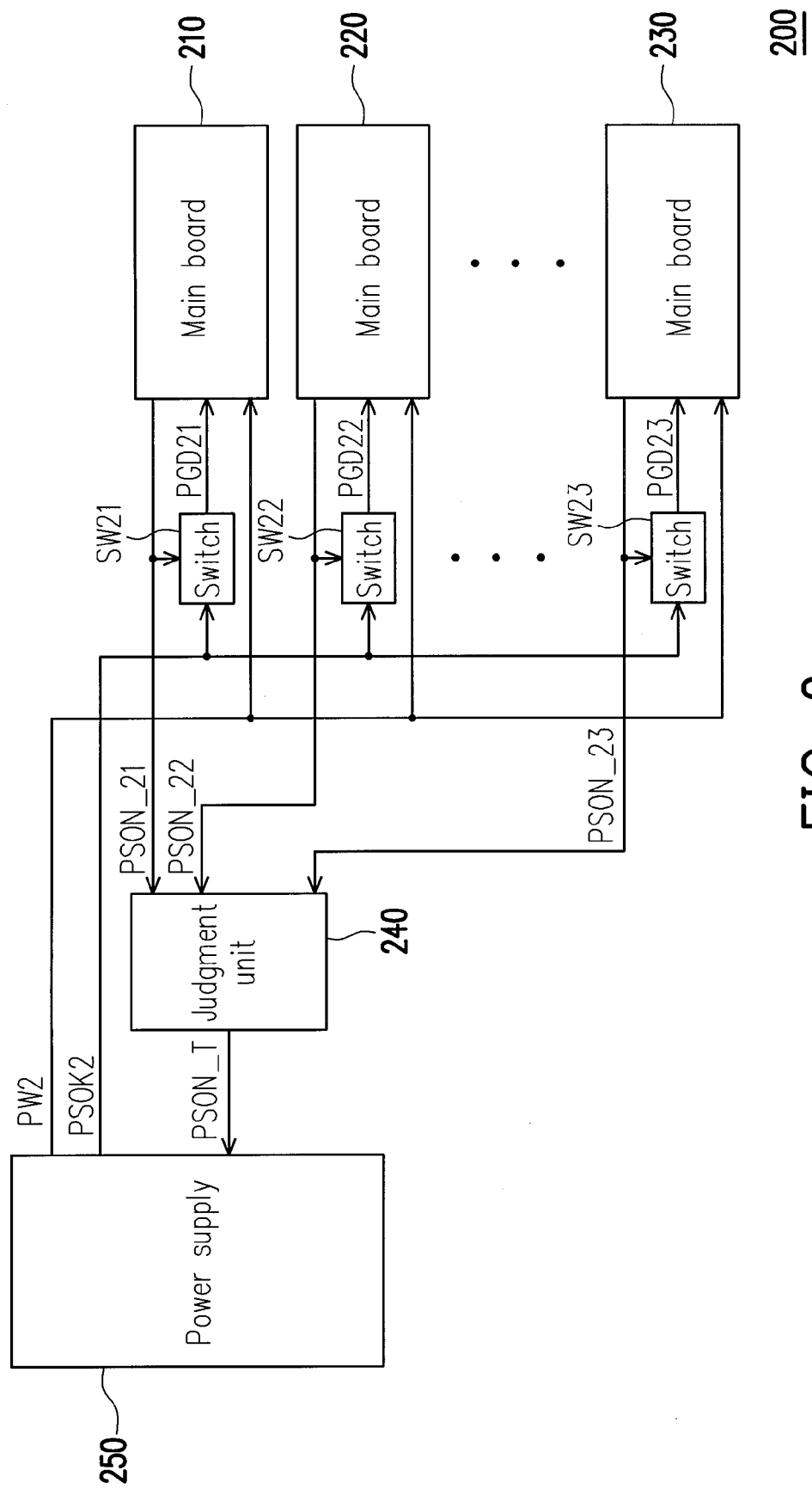
FIG. 2 is a circuit block diagram of a computer system according to an embodiment of the present invention.

FIG. 2 is a circuit block diagram of a computer system according to an embodiment of the present invention. Referring to FIG. 2, a computer system 200 includes a plurality of main boards 210-230, a judgment unit 240, a power supply 250 and a plurality of switches SW21-SW23. The judgment unit 240 is electrically connected to the main boards 210-230. The power supply 250 is electrically connected to the judgment unit 240 and the main boards 210-230. Moreover, the main boards 210-230 and the switches SW21-SW23 correspond to each other. The switch SW21 is electrically connected between the main board 210 and the power supply 250; the switch SW22 is electrically connected between the main board 220 and the power supply 250, and the switch SW23 is electrically connected between the main board 230 and the power supply 250.

In overall operation, the main board 210 determines whether to output a power start signal PSON_21 according to a received identification code. Similarly, the main board 220 determines whether to output a power start signal PSON_22 according to a received identification code. Likewise, an operation mechanism for the main board 230 to generate a power start signal PSON_23 can be inferred.

From another aspect, the judgment unit 240 receives the power start signals PSON_21, PSON_22 and PSON_23 to output a total power start signal PSON_T accordingly. The power supply 250 outputs a power reply signal PSOK2 according to the total power start signal PSON_T. It is noted that when one of the power start signals PSON_21, PSON_22 and PSON_23 is available, the judgment unit 240 outputs the available power reply signal PSOK2 so that the power supply 250 outputs an operating voltage PW2. Oppositely, when the power start signals PSON_21, PSON_22 and PSON_23 are all unavailable, the judgment unit 240 outputs the unavailable power reply signal PSOK2 so that the power supply 250 stops outputting the operating voltage PW2.

Although the operating voltage PW2 generated by the power supply 250 is transmitted to the main boards 210-230 simultaneously, the power reply signal PSOK2 generated by the power supply 250 is controlled by the switches SW21-SW23 and are not transmitted to the main boards 210-230 simultaneously.

According to the present embodiment, a first end of the switch SW21 receives the power reply signal PSOK2 and determines whether to output a power good signal PGD21 through a second end of the switch SW21 to the main board 210 according to the power start signal PSON_21. In other words, when the main board 210 generates the available power start signal PSON_21, the switch SW21 is turned on. Thus, the main board 210 receives the power good signal PGD21 and operates at the operating voltage PW2 to start performing corresponding actions.

Similarly, a first end of the switch SW22 receives the power reply signal PSOK2 and determines whether to output a power good signal PGD22 through a second end of the switch SW22 to the main board 220 according to the power start signal PSON_22. In other words, when the main board 220 generates the available power start signal PSON_22, the switch SW22 is turned on. At this moment, the main board 220 receives the power good signal PGD22 and uses the operating voltage PW2 to drive an inner circuit of the main board 220 and start acting. A switch mechanism of the switch SW23 and the operation mechanism for the main board 220 to start acting can be inferred likewise.

In summary, the power start signals PSON_21, PSON_22 and PSON_23 are controlled by the judgment unit; the signals are not affected by one another, and the power supply 250 also timely starts providing power according to the total power start signal PSON_T. In addition, the power reply signal PSOK2 is controlled by the switches SW21-SW23 so that only those main boards which generate available power start signals can start acting. Thus, the main boards 210-230 can be controlled independently from one another so as to reduce power consumption of the computer system 200 effectively.

In order for people having ordinary skill in the art to better understand the present embodiment, detailed architectures of the judgment unit 240 and the switches SW21-SW23 are further illustrated in the following.

Figure 3:
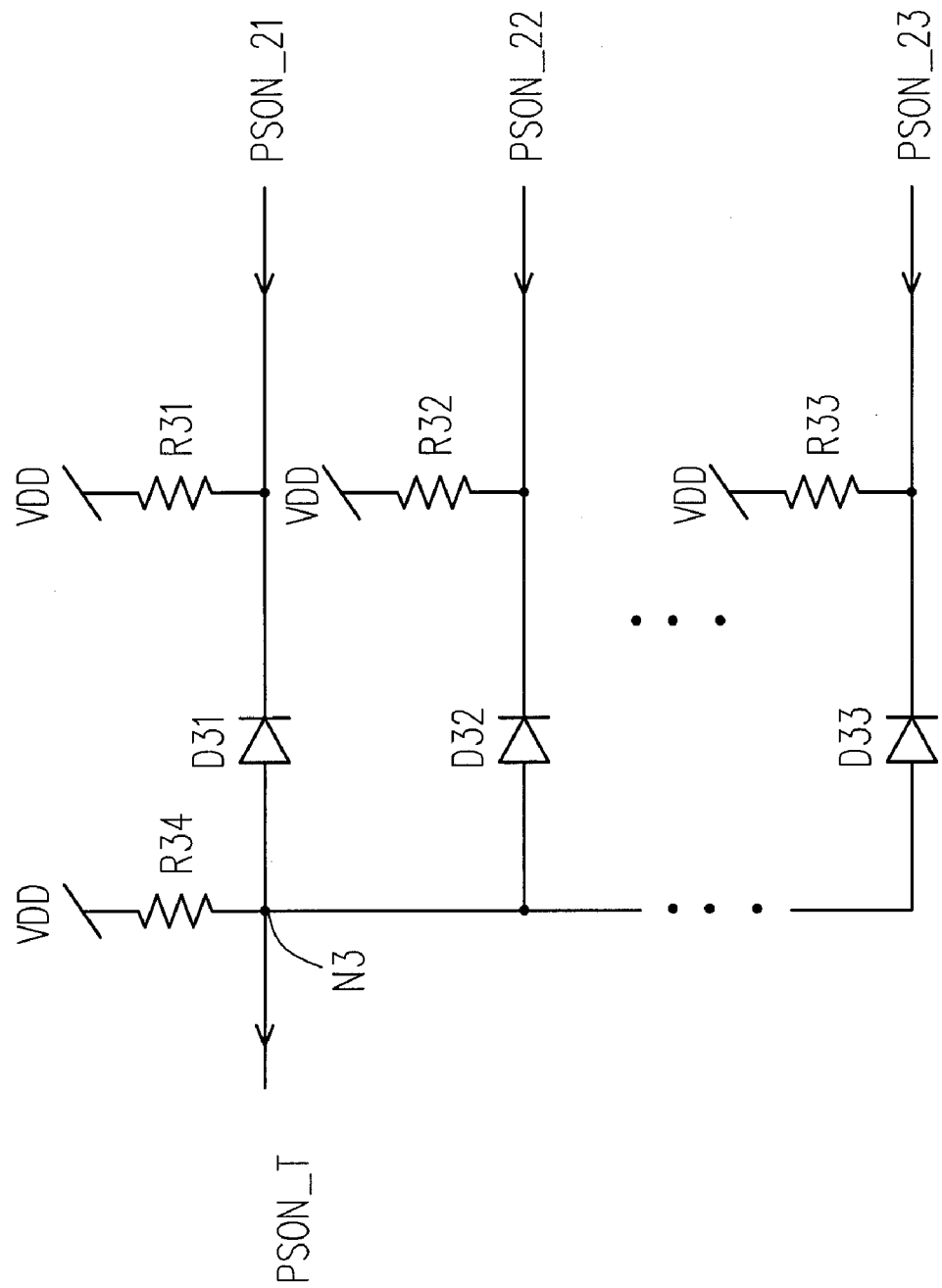
FIG. 3 is a schematic circuit diagram of a judgment unit according to an embodiment of the present invention.

FIG. 3 is a schematic circuit diagram of a judgment unit according to an embodiment of the present invention. Referring to FIG. 3, the judgment unit 240 includes a plurality of resistors R31-R34 and a plurality of diodes D31-D33. It should be noted that in the embodiment of FIG. 3, the available total power start signal PSON_T and the available power start signals PSON_21, PSON_22 and PSON_23 are all low-voltage signals. Therefore, in a physical architecture of the resistor R31, a first end of the resistor R31 receives a power voltage VDD, and a second end of the resistor R31 receives the power start signal PSON_21. Similarly, a first end of the resistor R32 receives the power voltage VDD, and a second end of the resistor R32 receives the power start signal PSON_22. A coupling method of the resistor R33 can be inferred likewise.

Furthermore, a cathode of the diode D31 is electrically connected to the second end of the resistor R31, and an anode of the diode D31 is electrically connected to a second end of the resistor R34. Similarly, the cathode of the diode D32 is electrically connected to the second end of the resistor R32, and the anode of the diode D32 is electrically connected to the second end of the resistor R34. A coupling method of the diode D33 can be inferred likewise. Moreover, a first end of the resistor R34 receives the power voltage VDD, and the second end of the resistor R34 outputs the total power start signal PSON_T.

In overall operation, when the power start signals PSON_21, PSON_22 and PSON_23 are all unavailable, meaning when the power start signals PSON_21, PSON_22 and PSON_23 are all high-voltage signals, the diodes D31-D33 cannot be turned on. At this moment, a voltage of a node N3 is maintained at the power voltage VDD so that the judgment unit 240 generates the total power start signal PSON_T which is unavailable. When the available power start signal PSON_21 is generated, meaning when the power start signal PSON_21 is a low-voltage signal, the diode D31 is turned on, and the voltage of the node N3 is also pulled down to generate the available total power start signal PSON_T.

It is noted that when the voltage of the node N3 is pulled down, the diode D32 is still maintained in a non-conducting state unless the power start signal PSON_22 is available. In other words, the power start signal PSON_21 generated by the main board 210 does not affect the other main boards 220-230. In addition, when the other main boards 220-230 generate the available power start signals PSON_22 and PSON_23, the voltage of the node N3 is still maintained at the original low voltage. In other words, when one of the power start signals PSON_21, PSON_22 and PSON_23 is available, the available total power start signal PSON_T is generated.

It should be noted that for the embodiment of FIG. 3, each of the switches SW21-SW23 of FIG. 2 can be constituted by a P-type transistor. Thus, the switches SW21-SW23 can turn on both ends thereof according to the available power start signals PSON_21, PSON_22 and PSON_23 (low-voltage signals) respectively.

Figure 4:
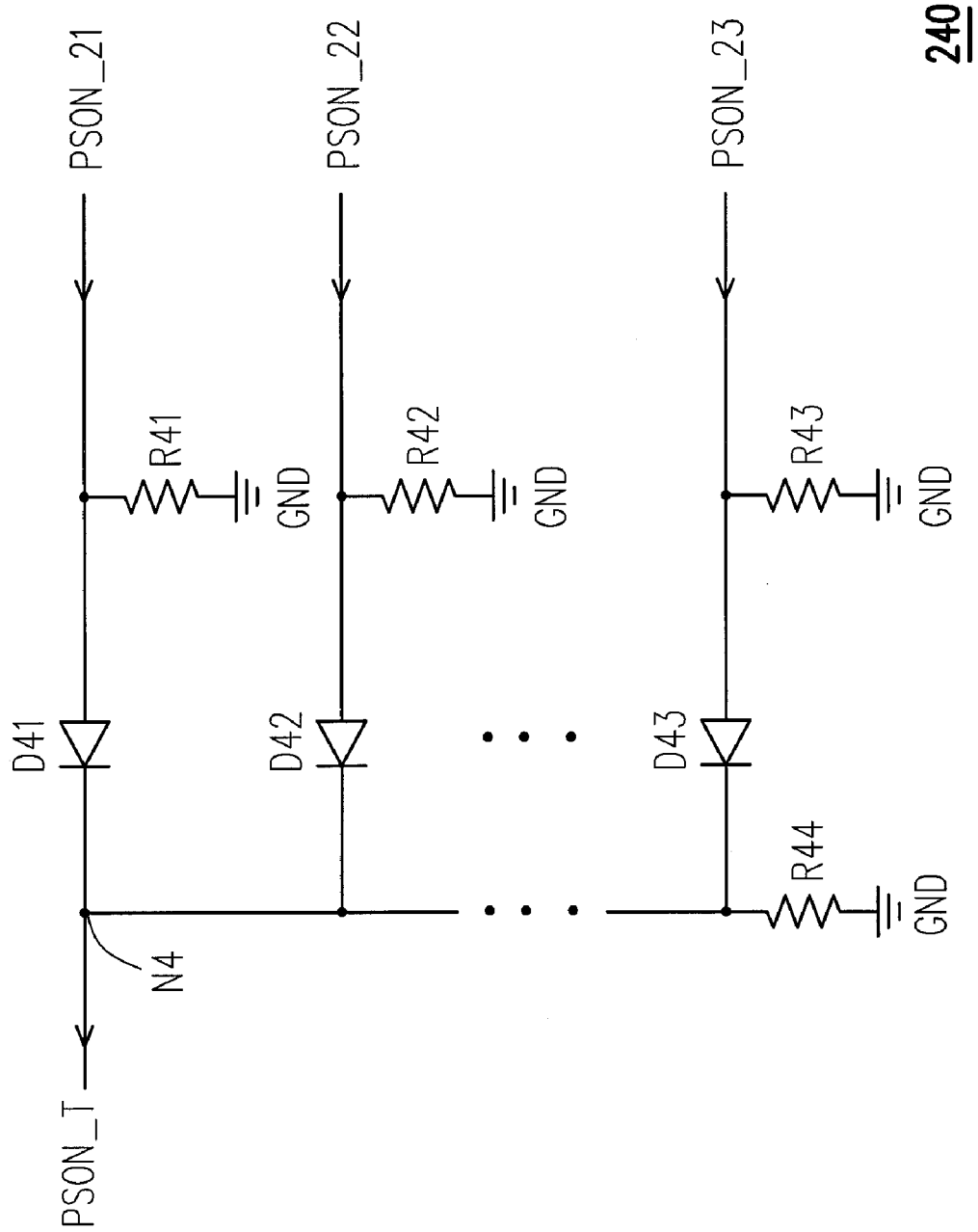
FIG. 4 is a schematic circuit diagram of a judgment unit according to another embodiment of the present invention.

FIG. 4 is a schematic circuit diagram of a judgment unit according to another embodiment of the present invention. Referring to FIG. 4, the judgment unit 240 includes a plurality of resistors R41-R44 and a plurality of diodes D41-D43. It should be noted that in the embodiment of FIG. 4, the available total power start signal PSON_T and the available power start signals PSON_21, PSON_22 and PSON_23 are all high-voltage signals. Therefore, in the physical architecture of the resistor R41, a first end of the resistor R41 receives a ground voltage GND, and a second end of the resistor R41 receives the power start signal PSON_21. Similarly, a first end of the resistor R42 receives the ground voltage GND, and a second end of the resistor R42 receives the power start signal PSON_22. A coupling method of the resistor R43 can be inferred likewise.

Furthermore, the anode of the diode D41 is electrically connected to the second end of the resistor R41, and the cathode of the diode D41 is electrically connected to a second end of the resistor R44. Similarly, the anode of the diode D42 is electrically connected to the second end of the resistor R42, and the cathode of the diode D42 is electrically connected to the second end of the resistor R44. A coupling method of the diode D43 can be inferred likewise. Moreover, a first end of the resistor R44 receives the ground voltage GND, and the second end of the resistor R44 outputs the total power start signal PSON_T.

In overall operation, when the power start signals PSON_21, PSON_22 and PSON_23 are all unavailable, meaning when the power start signals PSON_21, PSON_22 and PSON_23 are all low-voltage signals, the diodes D41-D43 cannot be turned on. At this moment, a voltage of a node N4 is maintained at the ground voltage GND so that the judgment unit 240 generates the unavailable total power start signal PSON_T. When the available power start signal PSON_21 is generated, meaning when the power start signal PSON_21 is a high-voltage signal, the diode D41 is turned on, and the voltage of the node N4 is also pulled up so as to generate the available total power start signal PSON_T.

It should be noted that when the voltage of the node N4 is pulled up, the diode D42 is still maintained in a non-conducting state unless the power start signal PSON_22 is available. In other words, through the judgment unit 240, the power start signal PSON_21 generated by the main board 210 does not affect the other main boards 220-230. In addition, when the other main boards 220-230 generate the available power start signals PSON_22 and PSON_23, the voltage of the node N4 is still maintained at the original high voltage. In other words, when one of the power start signals PSON_21, PSON_22 and PSON_23 is available, the available total power start signal PSON_T is generated.

It is noted that for the embodiment of FIG. 4, each of the switches SW21-SW23 of FIG. 2 can be constituted by an N-type transistor. Thus, the switches SW21-SW23 can turn on both ends thereof according to the available power start signals PSON_21, PSON_22 and PSON_23 (high-voltage signals) respectively.

In summary, in the present invention, the judgment unit prevents the power start signals respectively generated by the main boards from affecting one another. Additionally, under the control of a plurality of switches, the power reply signals generated by the power supply are not transmitted back to each of the main boards simultaneously. Oppositely, only those main boards generating available power start signals can receive a power good signal and use the operating voltage to drive inner circuits of the main boards and start acting. In other words, the main boards in the computer system can be controlled independently from one another so as to reduce the power consumption of the computer system effectively. Additionally, with the independent control among the main boards, consequently, users enjoy more convenience during operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer system, comprising:
    a first main board and a second main board, generating a first and a second power start signals respectively;
    a judgment unit, electrically connected with the first and the second main boards to receive the first and the second power start signals so as to output a total power start signal accordingly;
    a power supply, electrically connected with the judgment unit, the first and the second main boards to output a power reply signal according to the total power start signal; and
    a first switch and a second switch, receiving the power reply signal and determining whether to output a power good signal according to the first and the second power start signals respectively,
    wherein when one of the first and the second power start signals is available, the total power start signal and the power reply signal are both available so that the power supply outputs an operating voltage, and when the first and the second power start signals are both unavailable, the total power start signal and the power reply signal are both unavailable so that the power supply stops outputting the operating voltage.

2. The computer system as claimed in claim 1, wherein the judgment unit comprises:
    a first resistor, wherein a first end of the first resistor receives a first voltage, and a second end of the first resistor receives the first power start signal;
    a second resistor, wherein a first end of the second resistor receives the first voltage, and a second end of the second resistor receives the second power start signal;

a third resistor, wherein a first end of the third resistor receives the first voltage, and a second end of the third resistor outputs the total power start signal;

a first diode, electrically connected between the second ends of the first resistor and the third resistor; and a second diode, electrically connected between the second ends of the second resistor and the third resistor.

3. The computer system as claimed in claim 2, wherein the available first and second power start signals and the available total power start signal are low-voltage signals respectively.

4. The computer system as claimed in claim 3, wherein the first voltage is a power voltage, anodes of the first and the second diodes are electrically connected to the second end of the third resistor, and cathodes of the first and the second diodes are electrically connected to the second ends of the first resistor and the second resistor respectively.

5. The computer system as claimed in claim 3, wherein each of the first and the second switches is constituted by a P-type transistor.

6. The computer system as claimed in claim 2, wherein the available first and second power start signals and the available total power start signal are high-voltage signals respectively.

7. The computer system as claimed in claim 6, wherein the first voltage is a ground voltage, the cathodes of the first and the second diodes are electrically connected to the second end of the third resistor, and the anodes of the first and the second diodes are electrically connected to the second ends of the first resistor and the second resistor respectively.

8. The computer system as claimed in claim 6, wherein each of the first and the second switches is constituted by an N-type transistor.

9. A computer system, comprising:

N main boards, generating N power start signals, N being a positive integer;

a judgment unit, electrically connected with the N main boards to receive the power start signals and output a total power start signal;

a power supply, electrically connected with the judgment unit and the N main boards to output a power reply signal according to the total power start signal; and N switches, generating N power good signals, a first end of an $i^{th}$ switch of the N switches receiving the power reply signal and determining whether to output an $i^{th}$ power good signal of the N power good signals through a second end of the $i^{th}$ switch according to an $i^{th}$ power start signal of the N power start signals, i being an integer and $1 \leq i \leq N$, wherein when one of the N power start signals is available, the total power start signal and the power reply signal are both available so that the power supply outputs an operating voltage, and when all of the N power start signals are unavailable, the total power start signal and the power reply signal are both unavailable so that the power supply stops outputting the operating voltage.

10. The computer system as claimed in claim 9, wherein the judgment unit comprises:

(N+1) resistors, wherein a first end of an $i^{th}$ resistor receives a first voltage, a second end of the $i^{th}$ resistor receives the $i^{th}$ power start signal, a first end of an $(N+1)^{th}$ resistor receives the first voltage, and a second end of the $(N+1)^{th}$ resistor outputs the total power start signal; and N diodes, wherein an $i^{th}$ diode is electrically connected between the second ends of the $i^{th}$ resistor and the $(N+1)^{th}$ resistor.

11. The computer system as claimed in claim 10, wherein the available power start signals and the available total power start signal are low-voltage signals respectively.

12. The computer system as claimed in claim 11, wherein the first voltage is a power voltage, a cathode of the $i^{th}$ diode is electrically connected to the second end of the $i^{th}$ resistor, and an anode of the $i^{th}$ diode is electrically connected to the second end of the $(N+1)^{th}$ resistor.

13. The computer system as claimed in claim 11, wherein each of the N switches is constituted by a P-type transistor.

14. The computer system as claimed in claim 10, wherein the available power start signals and the available total power start signal are high-voltage signals respectively.

15. The computer system as claimed in claim 14, wherein the first voltage is a ground voltage, the anode of the $i^{th}$ diode is electrically connected to the second end of the $i^{th}$ resistor, and the cathode of the $i^{th}$ diode is electrically connected to the second end of the $(N+1)^{th}$ resistor.

16. The computer system as claimed in claim 14, wherein each of the N switches is constituted by an N-type transistor.

* * * * *